United States Patent
Noba

(10) Patent No.: US 7,686,495 B2
(45) Date of Patent: Mar. 30, 2010

(54) LIGHT SOURCE UNIT, BACKLIGHT UNIT AND DISPLAY APPARATUS HAVING THE SAME

(75) Inventor: Koya Noba, Tokorozawa (JP)

(73) Assignee: Citizen Electronics, Fujiyoshida-shi, Yamanashi-ken (JP)

( * ) Notice: Subject to any disclaimer, the term of this patent is extended or adjusted under 35 U.S.C. 154(b) by 103 days.

(21) Appl. No.: 11/957,836

(22) Filed: Dec. 17, 2007

(65) Prior Publication Data

US 2008/0151142 A1    Jun. 26, 2008

(30) Foreign Application Priority Data

Dec. 18, 2006 (JP) .............................. 2006-339764

(51) Int. Cl.
*F21V 7/04* (2006.01)
(52) U.S. Cl. ...................... 362/612; 362/621; 349/65
(58) Field of Classification Search ............... 362/611, 362/612, 621, 622, 623, 231; 349/65
See application file for complete search history.

(56) References Cited

U.S. PATENT DOCUMENTS 6,974,241 B2    12/2005    Hara et al.
6,991,358 B2 *  1/2006    Kokogawa ................ 362/619
2003/0184990 A1 * 10/2003    Lin .............................. 362/31

FOREIGN PATENT DOCUMENTS

| JP | 11-353920 A | 12/1999 |
| JP | 2005-129271 A | 5/2005 |
| JP | 2005-183124 A | 7/2005 |

OTHER PUBLICATIONS

Noba, U.S. Patent application entitled "Mobile Phone", U.S. Appl. No. 11/731,804, filed Mar. 30, 2007.

* cited by examiner

*Primary Examiner*—John A Ward
(74) *Attorney, Agent, or Firm*—Brinks Hofer Gilson & Lione

(57) ABSTRACT

A light source unit capable of obtaining white light with reduced color irregularity includes a plurality of light-emitting diodes (25R, 25G and 25B) having different emission spectrum peak wavelengths, and a light mixing member (21) that receives lights from the light-emitting diodes through an entrance surface (21a) and that allows lights to mix together before exiting through an exit surface (21b). The light mixing member (21) has anisotropic diffusing elements (22) that diffuse incident lights from the light-emitting diodes in a specific plane to effect light mixing.

14 Claims, 9 Drawing Sheets

[Fig. 1]
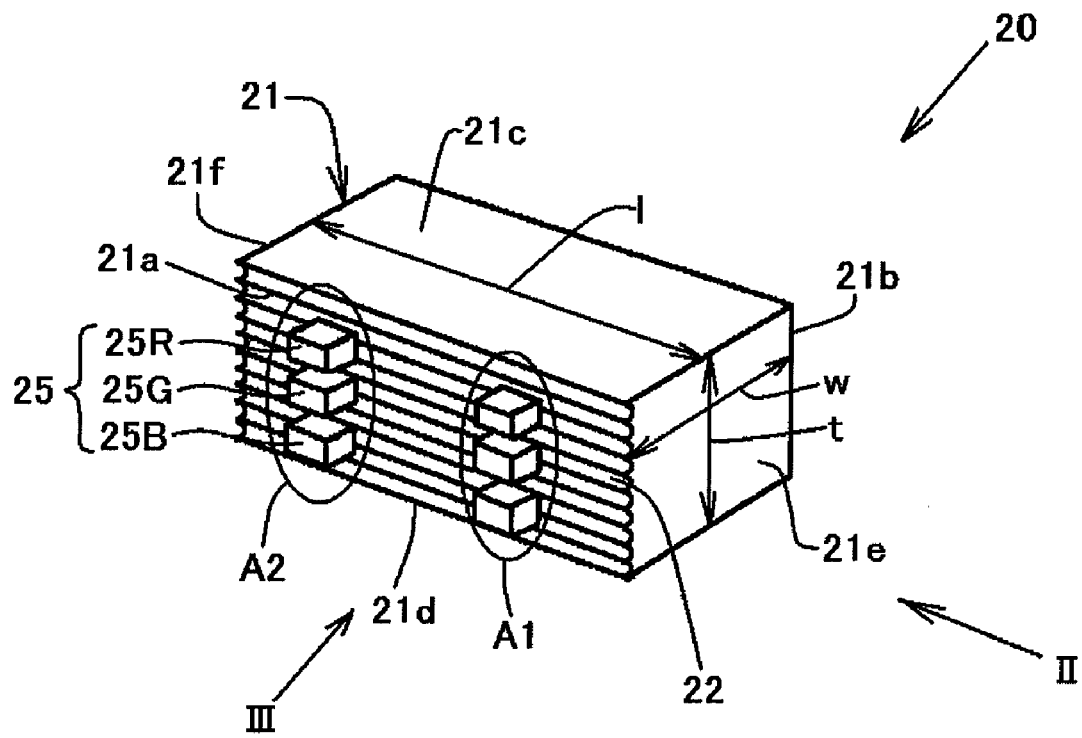
[Fig. 2]
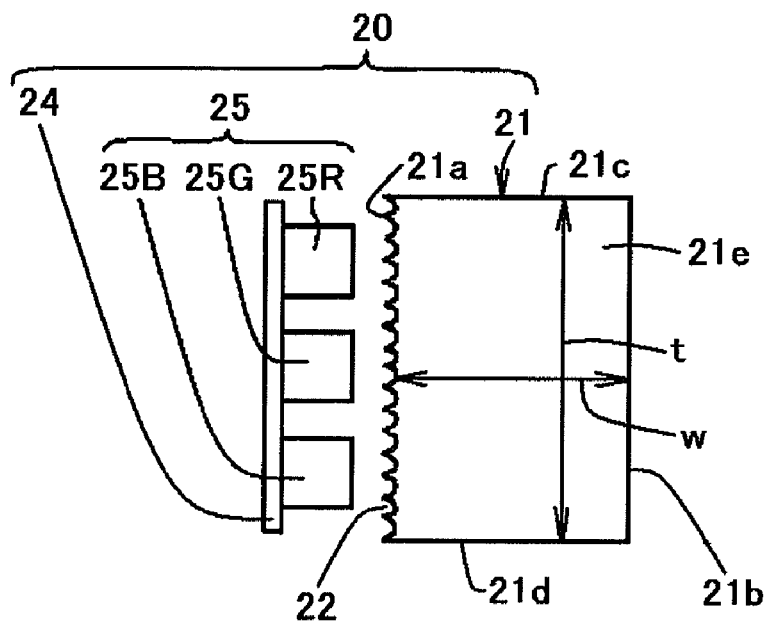

[Fig. 3]
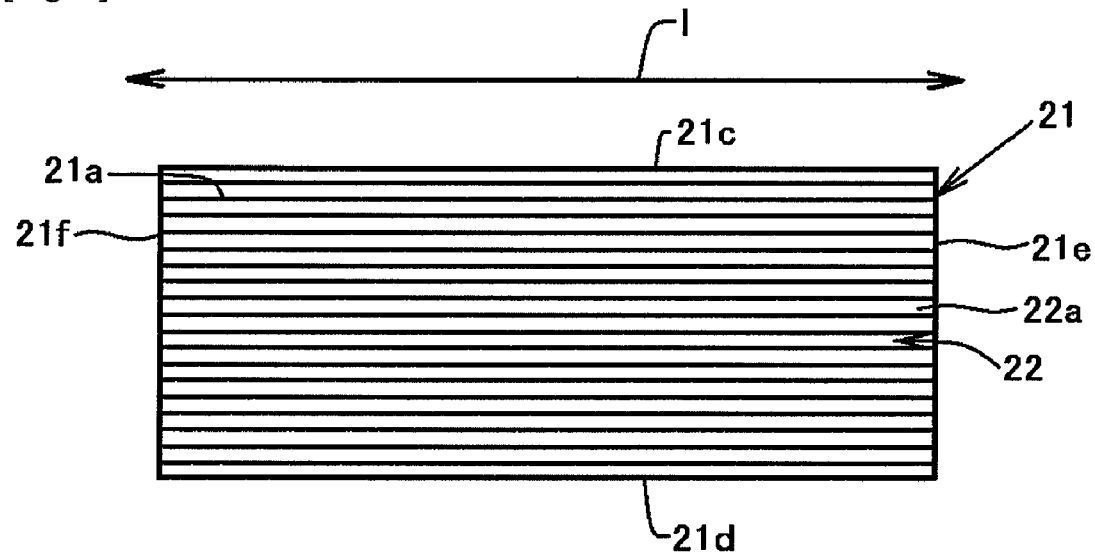
[Fig. 4]
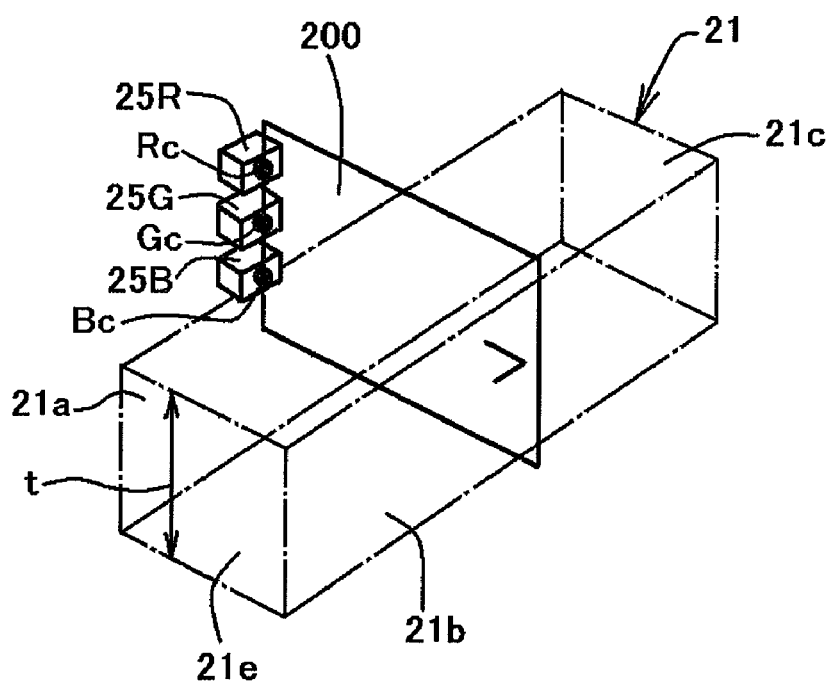

[Fig. 5]
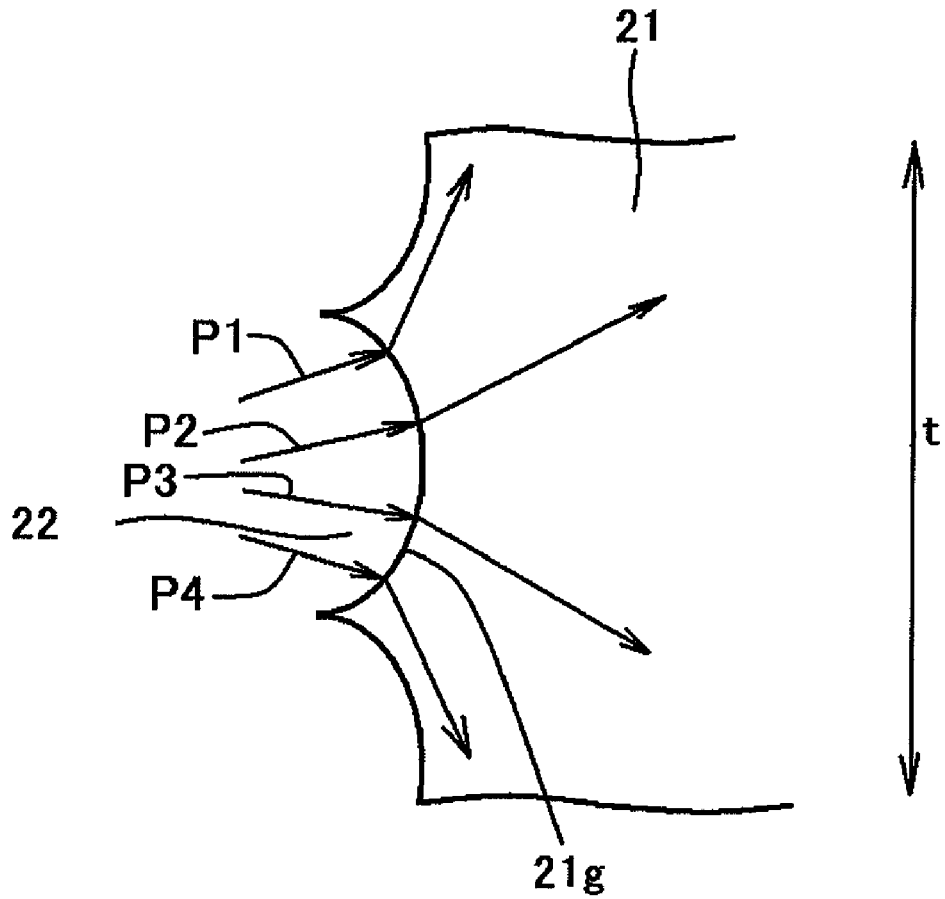
[Fig. 6]
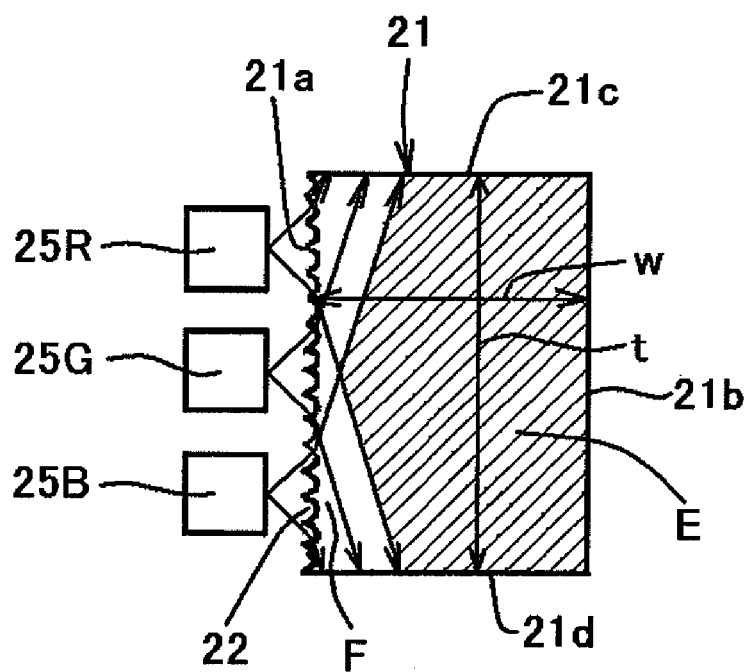

[Fig. 7a]
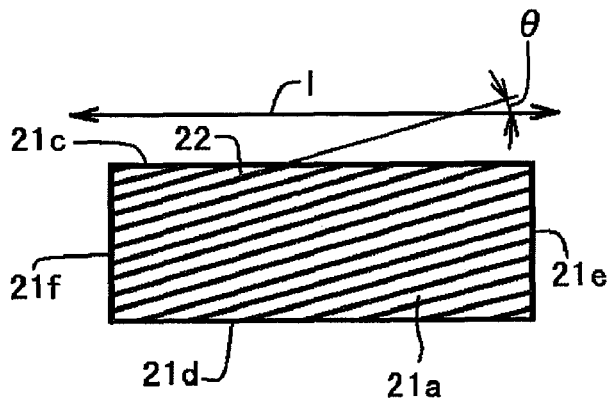
[Fig. 7b]
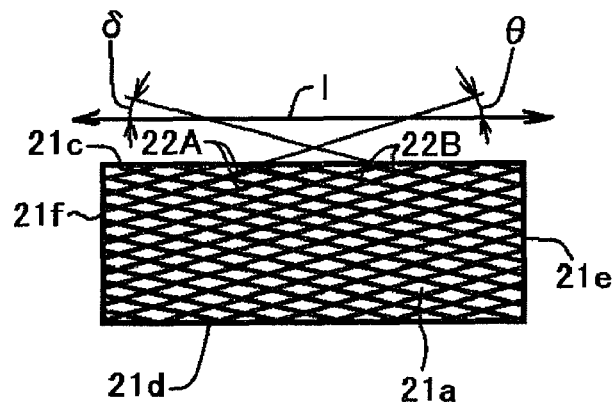
[Fig. 8a]
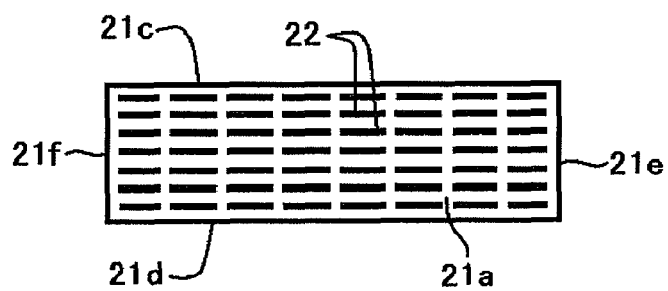
[Fig. 8b]
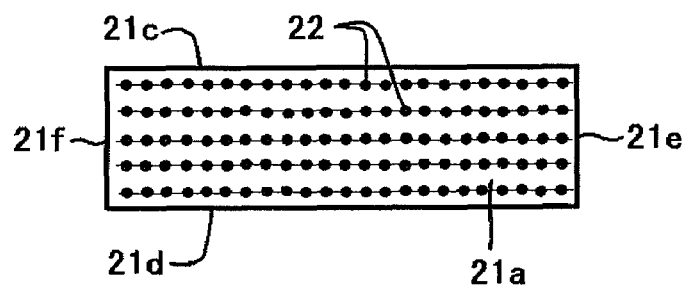

[Fig. 9a]
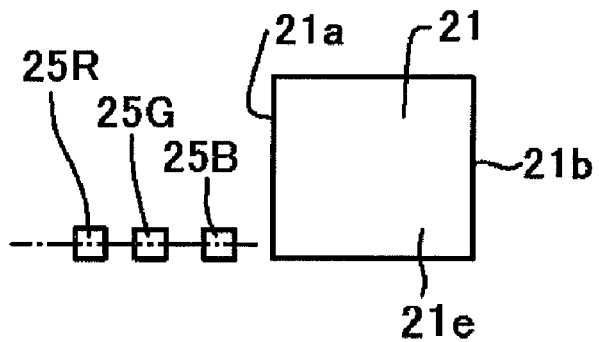
[Fig. 9b]
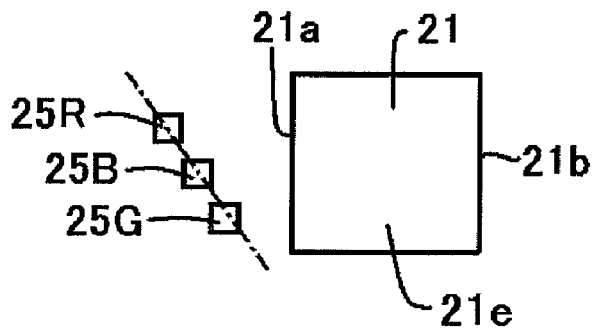
[Fig. 9c]
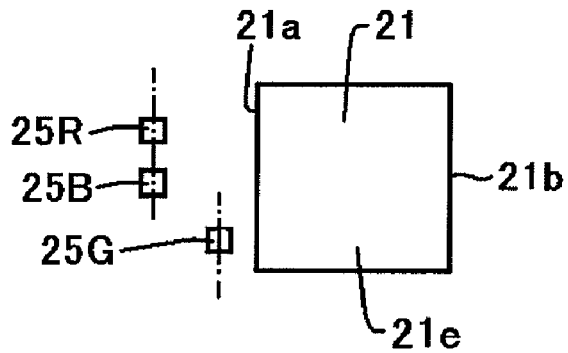
[Fig. 9d]
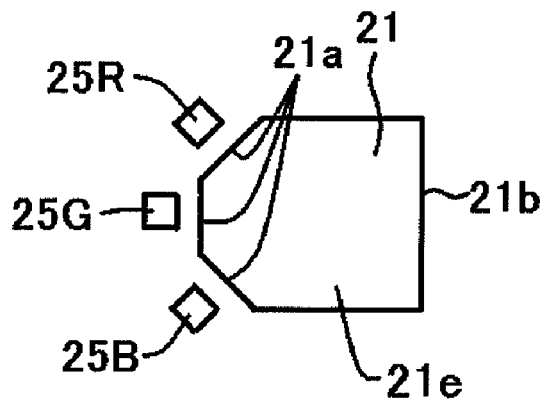

[Fig. 10]
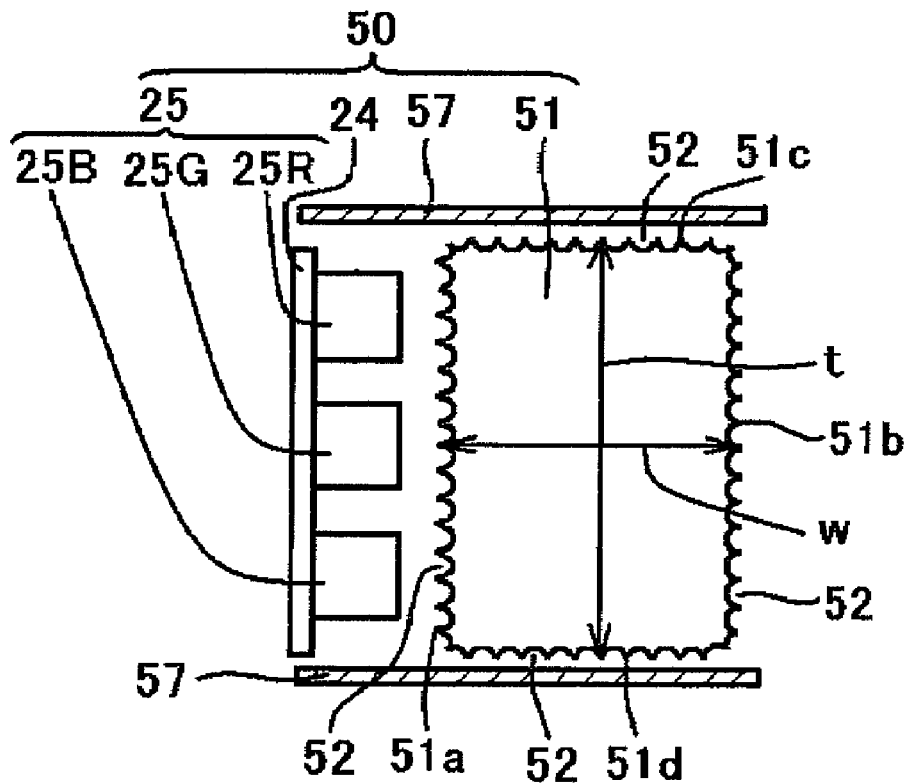
[Fig. 11]
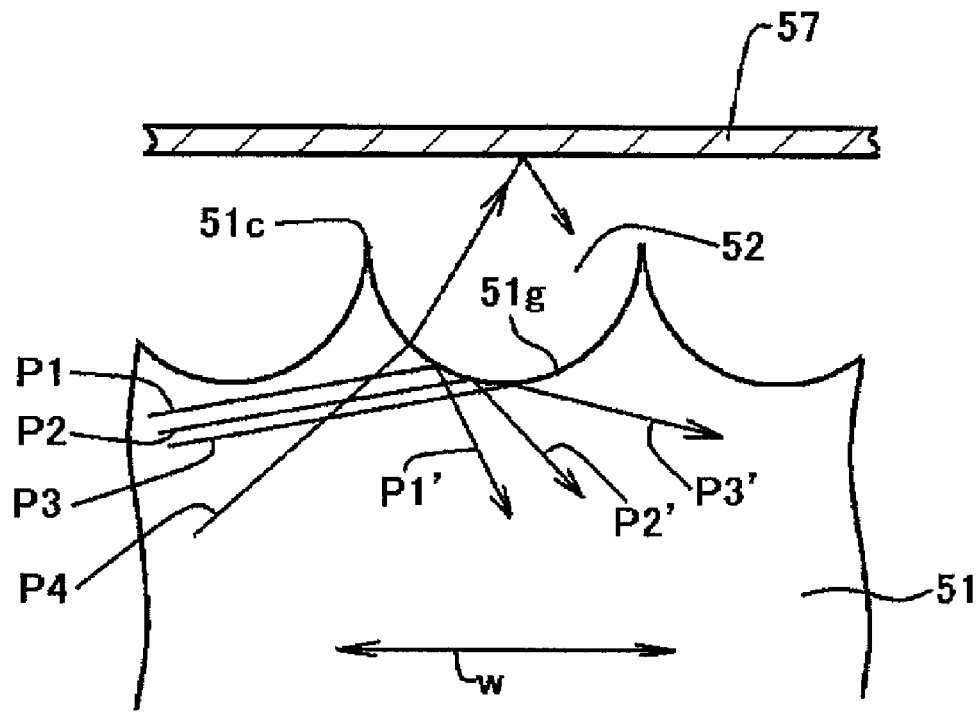

[Fig. 12]
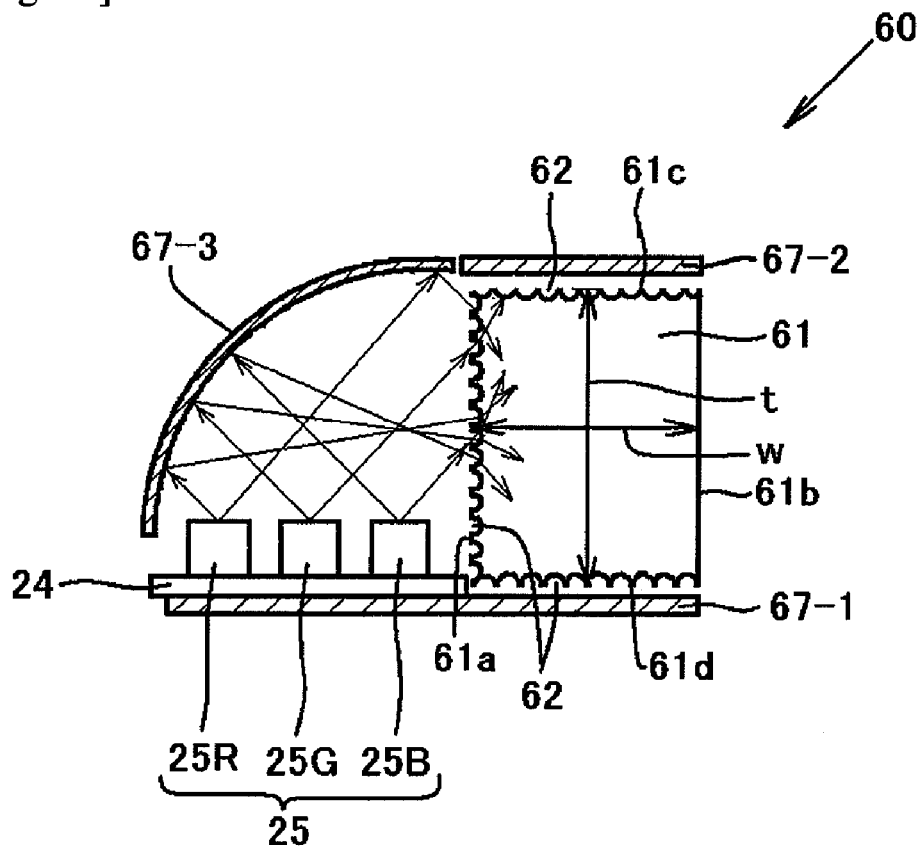
[Fig. 13]
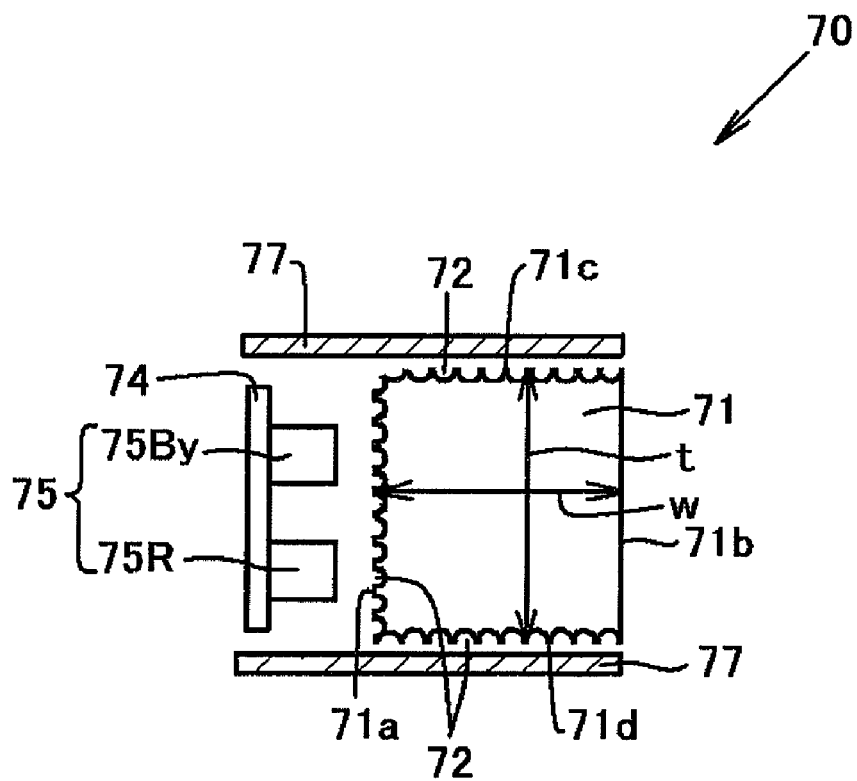

[Fig. 14]
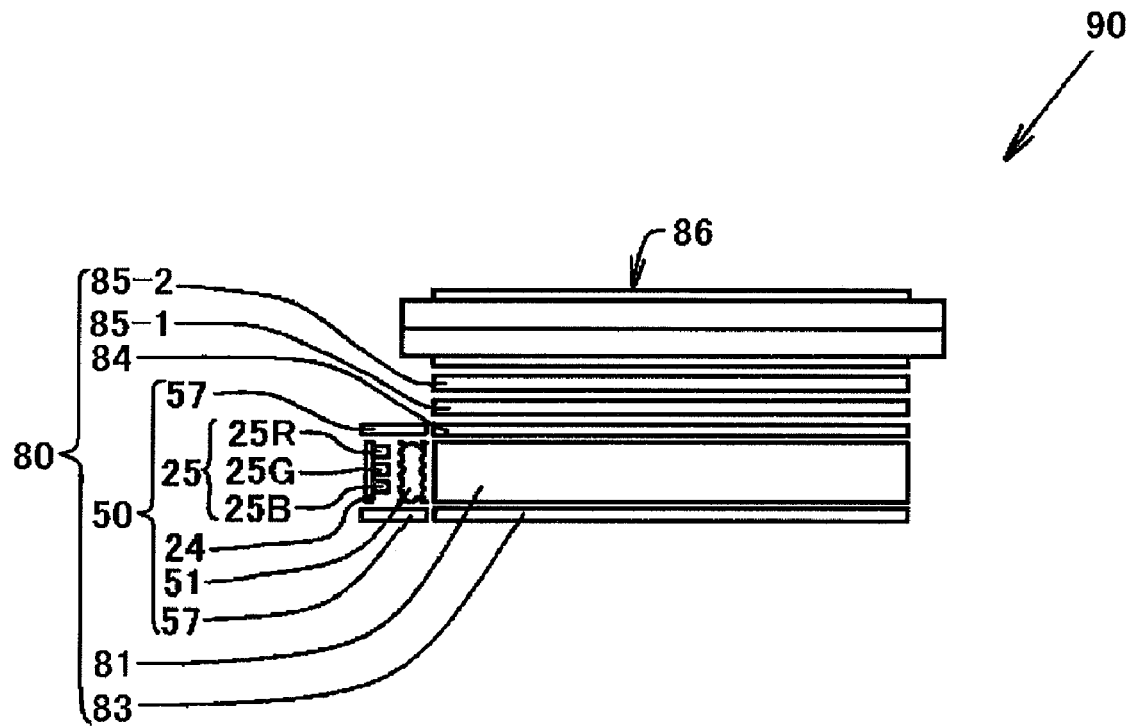
[Fig. 15]
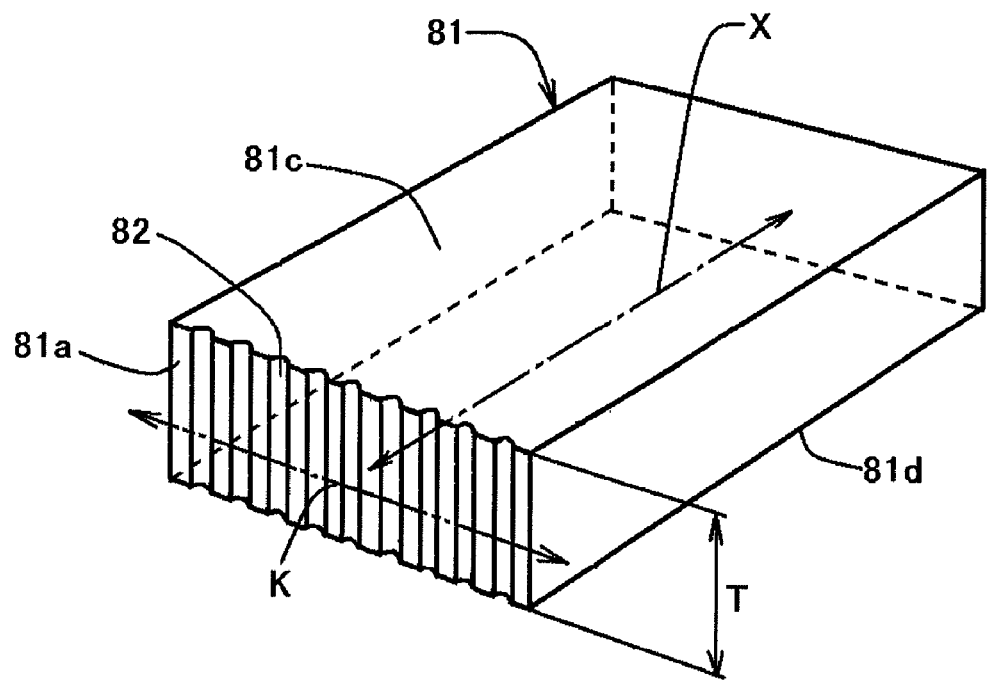

[Fig. 16]
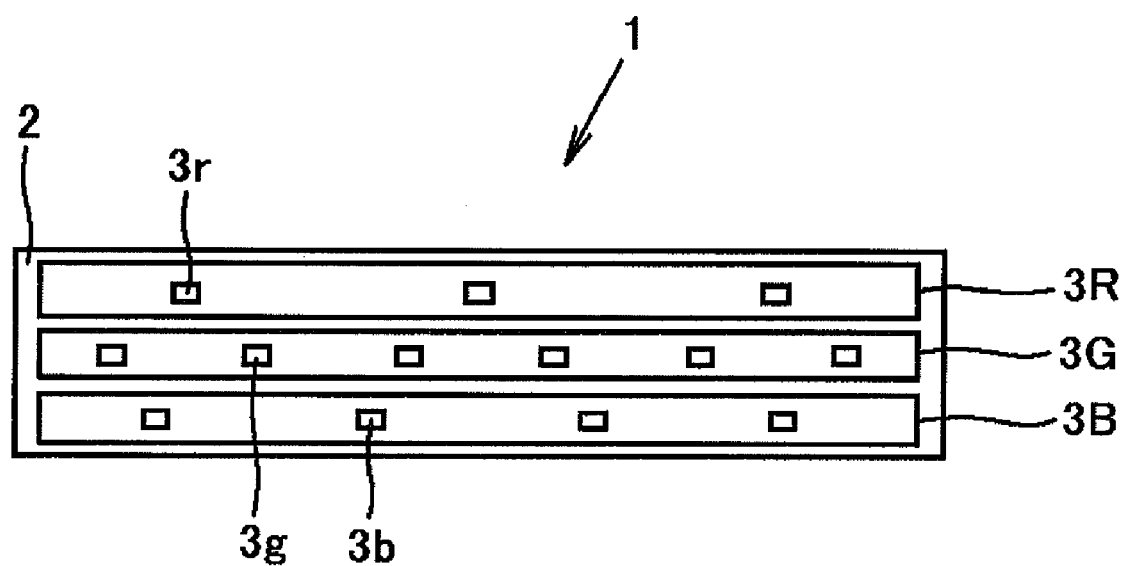

LIGHT SOURCE UNIT, BACKLIGHT UNIT AND DISPLAY APPARATUS HAVING THE SAME

This application claims priority under 35 U.S.C. §119 to Japanese Patent application No. JP2006-339764 filed Dec. 18, 2006, the entire content of which is hereby incorporated by reference.

TECHNICAL FIELD

The present invention relates to a light source unit that mixes a plurality of different colors of light from LED (light-emitting diode) light sources. The present invention also relates to a backlight unit and a display apparatus that have the light source unit.

RELATED CONVENTIONAL ART

Liquid crystal displays are widely used as thin display apparatus in small-sized portable devices, such as mobile phones and digital cameras, and also in medium- to large-sized image and picture displaying devices such as projectors, notebook personal computers, and liquid crystal monitors. Owing to recent improvements in emission efficiency of LEDs, the application range of LED light sources is expanding rapidly. For example, there have been developed liquid crystal display apparatus that use LEDs emitting red (R), green (G) and blue (B) in place of white LEDs or cold-cathode fluorescent lamps that have heretofore been used as light sources of backlight units.

A backlight unit of such a display apparatus mixes different colors of light from LEDs emitting red (R), green (G) and blue (B) to produce white light in a lightguide plate and emits it from an exit surface of the lightguide plate.

Japanese Patent Application Publication No. 2005-183124 discloses, as shown in FIG. 16, a light source unit 1 serving as an illuminating device that supplies light to a lightguide plate. The light source unit 1 has a plurality of linear light sources 3R, 3G and 3B emitting different colors of light, which are mounted on a mounting substrate 2. The linear light sources 3R, 3G and 3B respectively have a plurality of red LEDs 3r, a plurality of green LEDs 3g, and a plurality of blue LEDs 3b, which are spaced linearly in the width direction of an entrance surface of the lightguide plate. The linear light sources 3R, 3G and 3B are stacked in a height direction of the entrance surface.

According to the above-described Japanese Patent Application Publication No. 2005-183124, the light source unit 1 is disposed in adjacent to the entrance surface of the lightguide plate, and scattering and reflecting patterns are provided on a surface of the lightguide plate that is opposite to an exit surface thereof, so that light entering the lightguide plate is scattered by the scattering and reflecting patterns before exiting through the exit surface of the lightguide plate. With this arrangement, the Japanese Patent Application Publication states that satisfactory white light free from color irregularity can be obtained from the exit surface of the lightguide plate.

The technique disclosed in the above-described Japanese Patent Application Publication No. 2005-183124 suffers, however, from the following problem. Lights from the LEDs enter the lightguide plate through the entrance surface, and as it travel through the lightguide plate, the lights are scattered by the scattering and reflecting patterns provided on the surface opposite to the exit surface, thereby effecting light mixing to obtain white light. Therefore, the degree of scattering by the scattering and reflecting patterns is low near the entrance surface. Accordingly, color irregularity occurs near the entrance surface.

In general, LEDs have such directivity characteristics that the emission intensity is the strongest in the directly forward direction of the LED's light-emitting surface, and for light traveling obliquely from the light-emitting surface, the emission intensity becomes weaker as the angle from the directly forward direction increases. Therefore, in the linear light sources 3R, 3G and 3B also, the intensity of light from the light-emitting surface of each light source is the strongest near where each light-emitting device is mounted and becomes weaker with the distance from the light-emitting device. Accordingly, it is deemed difficult to set such that the intensity of exiting light becomes uniform over the entire light-emitting surface. In other words, the mounting positions of the LEDs 3r, 3g and 3b are not configured such that light in the directly forward direction, which is strong in intensity, can properly undergo color mixing. Therefore, color irregularity is likely to occur near the entrance surface of the lightguide plate. In addition, an area of the exit surface of the lightguide plate from which white light exits may appear as having color irregularity when viewed from an oblique direction. The main cause of the color irregularity is deemed to be due to the disagreement in directivity characteristics between the LEDs 3r, 3g and 3b.

SUMMARY OF THE INVENTION

An object of the present invention is to provide a light source unit capable of obtaining white light with reduced color irregularity.

Another object of the present invention is to provide a backlight unit having the light source unit.

Still another object of the present invention is to provide a display apparatus having the light source unit.

The present invention provides a light source unit including a plurality of LEDs having different emission spectrum peak wavelengths. The light source unit further includes a light mixing member having an entrance surface through which lights from the LEDs are received, an exit surface disposed opposite the entrance surface to allow the lights received through the entrance surface to exit therethrough, and anisotropic diffusing elements that diffuse the lights traveling from the entrance surface toward the exit surface so as to promote mixing of lights from the LEDs.

Accordingly, different colors of light, i.e. lights having different emission spectrum peak wavelengths emitted from the plurality of LEDs are diffused in specific directions by the anisotropic diffusing elements of the light mixing member, whereby light mixing is promoted, and it is possible to obtain white light with reduced color irregularity.

The light source unit may be arranged as follows. The light mixing member has a pair of mutually opposing side surfaces extending between the entrance surface and the exit surface. The side surfaces have a height and a width. The distance between the side surfaces is defined as a length of the light mixing member. The height of the side surfaces is defined as a thickness of the light mixing member. The width of the side surfaces is defined as a width of the light mixing member. The anisotropic diffusing elements diffuse the light from the LEDs, which enter through the entrance surface, in a plane containing an axis of the light mixing member in the direction of the thickness thereof and an axis of the light mixing member in the direction of the width thereof.

With the above-described arrangement, different colors of light from the plurality of LEDs are satisfactorily mixed together during the travel to the exit surface. Thus, it is possible to obtain white light with reduced color irregularity. It should be noted that the direction of diffusion of light as stated herein is the "thickness direction" as seen around the exit surface side.

In general, LEDs have directivity characteristics that nearly 90% of the intensity of light therefrom falls in an angle range of about 50° from the directly forward direction. To allow different colors of light from a plurality of LEDs having such directivity characteristics to mix together even more effectively, centers of light-emitting surfaces of the LEDs in the light source unit of the present invention are configured to be in the same plane that is substantially perpendicular to the exit surface and substantially parallel to the direction of the thickness of the light mixing member.

As an example of the positional relationship between the light mixing member and the LEDs disposed in the same plane, let us assume an arrangement in which the light mixing member is installed such that the length and width directions of the light mixing member are parallel to a horizontal plane and the height direction thereof is in the vertical direction, and in which the LEDs are stacked such that the centers of their light-emitting surfaces are aligned on a vertical line.

The LEDs appear to be a plurality of LEDs stacked along a vertical line as seen from a sideward direction relative to the light mixing member, but they appear to be a single LED as seen from above or below the light mixing member.

Regarding the directivity characteristics of the LEDs as seen from a sideward direction relative to the light mixing member, although the light-emitting surface centers of the LEDs are at different positions on a vertical line, lights are propagated through the light mixing member while being diffused so as to diverge in the vertical direction by the anisotropic diffusing elements. Therefore, it is possible to ignore the fact that the LEDs are disposed at different positions.

Regarding the directivity characteristics of the LEDs as seen from above or below the light mixing member, the installation positions of the LEDs are superimposed on one another, and the directivity characteristics are also superimposed on one another and thus appear to be the same characteristics. Accordingly, lights from the LEDs are propagated through the light mixing member in the state of being superimposed on one another. Therefore, centers of light-emitting surface of the LEDs having different emission spectrum peak wavelengths are configured to be in the same plane that satisfies a predetermined positional relationship with the light mixing member. By so doing, the LEDs can be regarded as a single LED. This makes it possible to ignore the fact that the LEDs are mounted at various directional positions, which would otherwise exert an influence on the color mixing action.

Consequently, the intensities of light of different colors are better balanced, and the different colors of light exit through the exit surface with equal directivity characteristics. Accordingly, it is possible to obtain white light with further reduced color irregularity.

In the light source unit, the anisotropic diffusing elements may be provided on at least the entrance surface. With this arrangement, lights from the LEDs are diffused by the anisotropic diffusing elements at the same time as they enter the light mixing member. Accordingly, it is possible to obtain white light with further reduced color irregularity.

The light source unit may be arranged as follows. The anisotropic diffusing elements comprise a plurality of substantially parallel elongated projections or recesses. The striped projections or recesses are provided substantially parallel to an axis of the light mixing member in the direction of the length thereof.

With the above-described arrangement, different colors of light emitted from the LEDs are diffused in at least the thickness direction of the light mixing member. Therefore, white light with reduced color irregularity can be obtained from the light mixing member.

The anisotropic diffusing elements may comprise a plurality of mutually parallel striped projections or recesses provided at an angle of inclination to an axis of the light mixing member in the direction of the length thereof. Alternatively, the anisotropic diffusing elements may include first anisotropic diffusing elements comprising a plurality of mutually parallel elongated projections or recesses provided at a first angle to the axis of the light mixing member in the direction of the length thereof, and second anisotropic diffusing elements comprising a plurality of mutually parallel elongated projections or recesses provided at a second angle to the axis of the light mixing member in the direction of the length thereof. The first and second anisotropic diffusing elements intersect each other.

With the above-described arrangement, lights can be diffused not only in the thickness and width directions of the light color member but also in the length direction thereof. In a case where a light source unit is formed by arranging a plurality of light-emitting diode sets each comprising red, green and blue LEDs, mixing of different colors of light emitted from mutually adjacent LED sets is promoted, so that it is possible to obtain white light with further reduced color irregularity.

The anisotropic diffusing elements may be provided in the form of continuous or discontinuous lines. If the anisotropic diffusing elements are provided in the form of continuous lines, all lights that are incident on the surface of each anisotropic diffusing element are diffused regularly. If the anisotropic diffusing elements are provided in the form of discontinuous lines, each line comprises portions where an anisotropic diffusing element is present and portions where it is not. Therefore, non-diffused rectilinearly propagated light emerges from where no anisotropic diffusing element is present. Accordingly, the anisotropic diffusing elements can also be utilized to control the degree of color mixing. It is also possible to produce diffusion in the length direction by utilizing the portions where no anisotropic diffusing element is present.

The projections or recesses constituting the anisotropic diffusing elements may have a substantially semicircular or triangular cross-section. The term "substantially semicircular cross-section" as used herein is defined as having a curved configuration such as a circular or elliptical configuration. A substantially semicircular curved surface is advantageous as follows. Light rays incident on a substantially semicircular curved surface at different positions have different angles of incidence. Consequently, the angle of refraction and hence direction of the diffusion also differ according to the light incident position. Accordingly, it is possible to diffuse light over a wide range and to obtain white light with reduced color irregularity. Similarly, projections or recesses of triangular cross-section can diffuse light over a wide range and obtain white light with reduced color irregularity.

Particularly, a substantially semicircular or triangular cross-section is a relatively simple configuration. Therefore, it is easy to make a mold used to injection-mold the light mixing member, and moldability can be improved.

The anisotropic diffusing elements enable adjustment of the area of light diffusion. If the anisotropic diffusing elements have a substantially semicircular cross-section, for example, the diffusion area can be adjusted by changing the curvature radius of the curved surfaces of the anisotropic diffusing elements. In the case of anisotropic diffusing elements having a triangular cross-section, the diffusion area can be adjusted by intermingling a plurality of triangular cross-sectional configurations having different apex angles. Adjusting the diffusion area in this way enables control of the amount of light emitted from the exit surface of the light mixing member and the degree of color mixing of the light. It is also possible to diffuse lights for color mixing independently of the size or the like of the light mixing member and in conformity to the shape of the light mixing member. Thus, white light with reduced color irregularity can be obtained.

In the light source unit, the light mixing member may be a substantially rectangular parallelepiped. The term "substantially rectangular parallelepiped" as used herein includes a rectangular parallelepiped configuration partly having inclined surfaces. Because such a substantially rectangular parallelepiped is a simple configuration, it is easy to make a mold used to mold the light mixing member, and the molding process can be performed easily. Therefore, the productivity of the light mixing member increases.

In the light source unit, the light color member may have reflecting members on the outer peripheral surfaces thereof except at least the exit surface. With this arrangement, light exiting through the surfaces of the light mixing member other than the exit surface is reflected by the reflecting members back into the light mixing member. Thus, the loss of light reduces, and the light utilization efficiency increases. Further, because refraction occurs when light exits the light mixing member and reenters it by reflection, the diffusion in the light mixing member can be promoted, and the loss of light can be reduced.

In the light source unit, the LEDs may have emission spectrum peak wavelengths in red, green and blue regions, respectively. When the red, green and blue LEDs are turned on simultaneously, white light is obtained by color mixing. Particularly, it is possible to obtain dark red and dark green tones, which have heretofore been difficult to produce with light sources using white LEDs or cold-cathode fluorescent lamps. Thus, the color reproduction range of color images displayed on a display apparatus can be expanded.

In the light source unit, the LEDs may include a whitish LED comprising a blue LED element coated with a fluorescent substance. When the whitish LED and a red LED are combined together, the color reproduction range of color images displayed on a display apparatus can be expanded by using only two different kinds of LEDs.

In addition, the present invention provides an edge-light type backlight unit having at least a lightguide plate and a light source, wherein light from the light source is received through an entrance surface of the lightguide plate, and the received light is propagated through the lightguide plate to exit through an exit surface thereof. The above-described light source unit is provided near the entrance surface of the lightguide plate.

With the above-described arrangement, white light with reduced color irregularity enters the lightguide plate. Therefore, it is possible to obtain uniformly color-mixed white light from the exit surface of the lightguide plate. Particularly, color irregularity does not occur at a region of the exit surface near the entrance surface of the lightguide plate. Therefore, the entire exit surface of the lightguide plate can be used as an image display area of a display apparatus. Further, because refraction occurs both when light exits the light mixing member and when light enters the lightguide plate, diffusion of light in the lightguide plate is promoted, and white light with further reduced color irregularity can be obtained from the exit surface of the lightguide plate.

The entrance surface of the lightguide plate may be provided with a plurality of elongated projections or recesses that diffuse light received from the light source unit in a length direction of the lightguide plate that is defined by a direction substantially parallel to the exit surface of the lightguide plate and substantially perpendicular to an axis of the lightguide plate in a light propagation direction.

With the above-described arrangement, light received from the light source unit can be diffused also in the length direction of the lightguide plate. In a case where the light source unit is formed by arranging a plurality of LED sets each comprising red, green and blue LEDs, mixing of different colors of light emitted from mutually adjacent LED sets occurs by diffusion in the length direction of the lightguide plate caused by the projections or the recesses. Thus, white light with reduced color irregularity can be obtained.

It is also possible to widen the spacing between the mutually adjacent LED sets and hence possible to reduce the number of LEDs used. Thus, a cost-reduction effect is obtained.

In the above-described edge-light type backlight unit, the exit surface of the light source unit and the entrance surface of the lightguide plate may be placed in close contact with each other.

In the backlight unit wherein the exit surface of the light source unit and the entrance surface of the lightguide plate are placed in close contact with each other, light emitted from the light source unit enters the lightguide plate through a short distance without passing through an air layer. Therefore, the loss of light is reduced, and it is possible to take an increased amount of light through the entrance surface of the lightguide plate. Thus, well color-balanced white light exiting the light mixing member can be made to enter the lightguide plate as it is, and white light with reduced color irregularity can be obtained from the exit surface of the lightguide plate.

The arrangement in which the light mixing member and the lightguide plate are placed in close contact with each other enables an improvement in the light utilization efficiency of the backlight unit and makes it possible to realize a brighter backlight unit.

In a case where the entrance surface of the lightguide plate and the exit surface of the light source unit are placed in close contact with each other, the light mixing member of the light source unit is preferably formed from a material having a refractive index smaller than that of a material used to form the lightguide plate.

With the above-described arrangement, light emitted from the light source is propagated from a substance of a low refractive index to a substance of a high refractive index. Therefore, the light is not influenced by the critical angle for reflection at the interface between the two substances. Thus, white light with balanced color components can be made to enter the lightguide plate. In addition, light traveling in all directions toward the entrance surface of the lightguide plate is allowed to exit the light source unit. Thus, the amount of light entering the lightguide plate through the entrance surface increases, and a brighter backlight unit can be realized.

In addition, the present invention provides a display apparatus having the above-described backlight unit at the back of a liquid crystal display panel. It is possible according to the present invention to obtain a display apparatus free from visually recognizable color irregularity and having a widened color reproduction range. In addition, because the backlight unit can be reduced in thickness, the thickness of the display apparatus can also be reduced correspondingly.

EFFECTS OF THE INVENTION

As has been stated above, light from a plurality of LEDs having different emission spectrum peak wavelengths is diffused in a specific direction by a light mixing member provided with anisotropic diffusing elements. Therefore, color mixing can be promoted, and it is possible to obtain white light with reduced color irregularity.

Particularly, in the present invention, centers of light-emitting surfaces of the LEDs are configured to be in the same plane that is substantially perpendicular to the exit surface and substantially parallel to the thickness direction of the light mixing member. Therefore, light emitted from the center of the light-emitting surface of each LED, which has a strong emission intensity, can be diffused effectively. Thus, white light with further reduced color irregularity can be obtained.

Thus, it is possible accordingly to the present invention to provide a light source unit capable of obtaining white light with reduced color irregularity and a backlight unit and a display apparatus having the light source unit.

BRIEF DESCRIPTION OF THE DRAWINGS

FIG. 1 is a perspective view of a light source unit according to an embodiment of the present invention.

FIG. 2 is a side view of the light source unit as seen from the direction of the arrow II in FIG. 1.

FIG. 3 is a side view of a light mixing member of the light source unit as seen from the direction of the arrow III in FIG. 1.

FIG. 4 is a schematic view illustrating the positional arrangement of LEDs in FIG. 1.

FIG. 5 is a schematic view illustrating the action of anisotropic diffusing elements in FIG. 1.

FIG. 6 is a schematic view illustrating the action of the light source unit in FIG. 1.

FIG. 7a is a schematic view showing an alternative configuration of the anisotropic diffusing elements in which parallel rows of anisotropic diffusing elements are at an angle of inclination to an axis of the light mixing member in the length direction thereof.

FIG. 7b is a schematic view showing another alternative configuration of the anisotropic diffusing elements in which two sets of parallel rows of anisotropic diffusing elements intersect each other.

FIG. 8a is a schematic view showing an anisotropic diffusing element configuration in which anisotropic diffusing elements in the form of discontinuous lines are dash-shaped recesses.

FIG. 8b is a schematic view showing another anisotropic diffusing element configuration in which anisotropic diffusing elements in the form of discontinuous lines are dot-shaped recesses.

FIG. 9a is a side view showing one example of other alternative arrangements of LEDs in which R, G and B LEDs are disposed in series in a direction perpendicular to an entrance surface of the light mixing member.

FIG. 9b is a side view showing an arrangement of LEDs in which R, G and B LEDs are disposed in a stair-like fashion in front of the entrance surface of the light mixing member.

FIG. 9c is a side view showing an arrangement of LEDs in which R and B LEDs are disposed slightly away from the entrance surface of the light mixing member, while a G LED is disposed in closer proximity to the entrance surface.

FIG. 9d is a side view showing an arrangement of LEDs in which R, G and B LEDs are positioned in conformity to the configuration of the light mixing member.

FIG. 10 is a fragmentary sectional view of an essential part of a light source unit according to another embodiment of the present invention.

FIG. 11 is a schematic view illustrating the action of anisotropic diffusing elements provided on a top surface of a light mixing member in FIG. 10.

FIG. 12 is a fragmentary sectional view of an essential part of a light source unit according to a further embodiment of the present invention.

FIG. 13 is a fragmentary sectional view of an essential part of a light source unit according to a still further embodiment of the present invention.

FIG. 14 is a side view of a display apparatus according to a still further embodiment of the present invention.

FIG. 15 is a perspective view of a lightguide plate in FIG. 14.

FIG. 16 is a perspective view showing the arrangement of linear light sources of a light source unit disclosed in a related conventional art.

DETAILED DESCRIPTION OF THE INVENTION

An embodiment of the present invention will be explained below with reference to FIGS. 1 to 9d. In the following explanation, the term "substantially" is used in such phrases as "substantially perpendicular" and "substantially parallel". The reason for this is as follows. The configuration of constituent members used in the present invention is not limited to a rectangular parallelepiped but may include a shape partly having inclined surfaces, for example. The term "substantially" is also used to explain constituent members in consideration of errors in machining accuracy.

As shown in FIGS. 1 and 2, a light source unit 20 in this embodiment has a plurality of LED sets 25 and a light mixing member 21 that mixes different colors of light i.e., lights having different emission spectrum peak wavelengths from the LED sets 25 entering through an entrance surface 21a and that emits the color-mixed light from an exit surface 21b. The light mixing member 21 in this embodiment is of a substantially rectangular parallelepiped configuration and has an entrance surface 21a, an exit surface 21b opposite to the entrance surface 21a, side surfaces 21e and 21f, a top surface 21c, and a bottom surface 21d. It should be noted that the light mixing member 21 in this embodiment is formed by using a transparent resin, e.g. an acrylic resin, or a polycarbonate resin. In this embodiment, the light source unit 20 has two LED sets 25 mounted on a mounting substrate 24. Each LED set 25 comprises an R LED 25R, a G LED 25G and a B LED 25B, as shown by being encircled with the ovals A1 and A2 in FIG. 1.

Here, let us define the length direction l, thickness direction t and width direction w of the light mixing member 21, which are shown by the double-pointed arrows in FIGS. 1 and 2.

The length direction l of the light mixing member 21 is the longitudinal direction of the top surface 21c or the bottom surface 21d. The thickness direction t of the light mixing member 21 is the direction of the height of the side surface 21e or the side surface 21f, i.e. the direction of the distance between the top surface 21c and the bottom surface 21d. The width direction w of the light mixing member 21 is the direction of the width of the side surface 21e or the side surface 21f, i.e. the direction of the distance between the entrance surface 21a and the exit surface 21b.

The entrance surface 21a is provided with anisotropic diffusing elements 22 that diffuse incident light from the LEDs 25R, 25G and 25B in specific directions to effect color mixing. The diffusion in specific directions is diffusion in a plane containing an axis of the light mixing member 21 in the thickness direction t and an axis thereof in the width direction w, i.e. diffusion in the thickness direction t as viewed from the exit surface 21b side. To diffuse light in the specific direction, the anisotropic diffusing elements 22 comprise, as shown in FIG. 3, a plurality of striped recesses 22a formed on the entrance surface 21a substantially parallel to the length direction 1 of the light mixing member 21. The recesses 22a are sufficiently fine relative to the area of the LED's light-emitting surface.

In this embodiment, the recesses 22a have a substantially semicircular cross-section. The most favorable effect can be obtained with gently curved cross-sectional configurations such as semicircular and semielliptical configurations. In this embodiment, the cross-sectional configuration of the recesses 22a is defined as being "substantially semicircular", including such gently curved configurations. Although in this embodiment the anisotropic diffusing elements 22 comprise recesses 22a having a substantially semicircular cross-section, the anisotropic diffusing elements 22 may be in the form of projections or recesses that produce a diffusing action by refraction of light. For example, the anisotropic diffusing elements 22 may comprise projections each having a substantially semicircular cross-section or may comprise recesses or projections each having a triangular cross-section. The light mixing member 21 is formed by injection molding process. In this regard, because the substantially semicircular or triangular cross-section is a simple configuration, it is easy to make a mold used to injection-mold the light mixing member 21, and the injection molding process can be performed easily.

Next, the arrangement of the LEDs 25R, 25G and 25B constituting each LED set 25 will be explained with reference to FIG. 4, which is a schematic view illustrating the arrangement of LEDs in FIG. 1.

In general, LEDs have directivity characteristics that nearly 90% of the intensity of light therefrom falls in an angle range of about 50 degrees around the directly forward direction. As shown in FIG. 4, the LEDs 25R, 25G and 25B are arranged such that the centers Rc, Gc and Bc of their light-emitting surfaces are in the same plane 200. The plane 200 is substantially perpendicular to the exit surface 21b of the light mixing member 21 and substantially parallel to the thickness direction t of the light mixing member 21. The LEDs are arranged in the order of the B LED 25B, the G LED 25G and the R LED 25R from the bottom surface 21d toward the top surface 21c. Although the LED sets 25 shown in FIG. 1 each have their LEDs 25R, 25G and 25B arranged in the same order, the order in which the LEDs are arranged may be different between the LED sets 25. If the LED arrangement order differs for each LED set 25, color mixing is further promoted. It should be noted that the plane 200 is a hypothetical plane provided for the sake of easier explanation. In actuality, such a plane is not provided.

In this embodiment, the light mixing member 21 is a substantially rectangular parallelepiped, and the entrance surface 21a and the exit surface 21b are provided opposite each other. Therefore, the plane 200 and the anisotropic diffusing elements 22 are substantially perpendicular to each other.

The operation of the above-described light source unit 20 will be explained below with reference to FIGS. 5 and 6. FIG. 5 is a schematic view illustrating the action of the anisotropic diffusing elements 22 in FIG. 1. FIG. 6 is a schematic view illustrating the operation of the light source unit 20 in FIG. 1.

First, the way in which lights emitted from the LED sets 25 are diffused when incident on the anisotropic diffusing elements 22 will be explained with reference to FIG. 5. FIG. 5 is an enlarged view of a part of the anisotropic diffusing elements 22 provided on the light mixing member 21. Lights emitted from the LED sets 25 are incident on the interface 21g of each recess 22a constituting the anisotropic diffusing elements 22 from various directions. However, the following explanation will be made with regard to light rays P1, P2, P3 and P4, by way of example.

As shown in FIG. 5, the light rays P1, P2, P3 and P4 are incident on the interface 21g at different angles of incidence and therefore refracted at different angles of refraction when entering the inside of the light mixing member 21. Because the recess 22a is semicircular in cross-section, refraction at the interface 21g causes the light rays P1, P2, P3 and P4 to travel while being diffused in the thickness direction t of the light mixing member 21, as shown by the arrows. Such a diffusing action also takes place at projections having a substantially semicircular cross-section or at recesses or projections having a triangular cross-section.

A substantially semicircular curved surface enables adjustment of the area of diffusion in the thickness direction t of the light mixing member 21 by changing the curvature radius of the curved surface. For example, if the curvature radius is increased, the diffusion area narrows, whereas if the curvature radius is decreased, the diffusion area widens. In the case of recesses or projections having a triangular cross-section, the diffusion area can be adjusted by intermingling a plurality of triangular cross-sectional configurations having different apex angles. Adjusting the diffusion area in this way enables control of the amount of light emitted from the exit surface 21b and the degree of color mixing of the light. It is also possible to diffuse lights independently of the size or the like of the light mixing member 21 and in conformity to the shape of the light mixing member 21.

The diffusing action takes place at the interfaces 21g of all the recesses 22a constituting the anisotropic diffusing elements 22. As shown in FIG. 6, lights emitted from the LEDs 25R, 25G and 25B, which emit different colors of light, are diffused in the thickness direction t of the light mixing member 21 by refraction at the interfaces 21g of the recesses 22a and propagated through the light mixing member 21 while undergoing reflection or the like. During the travel through the light mixing member 21, the different colors of light from the LEDs 25R, 25G and 25B are mixed together into white light of good color balance as shown in the hatched region E, and the white light exits through the exit surface 21b. In this embodiment, because the entrance surface 21a is provided with the anisotropic diffusing elements 22, diffusion occurs rapidly, resulting in a minimal region F where occurrence of color irregularity appears clearly. Thus, white light of good color balance and with reduced color irregularity can be obtained from the exit surface 21b.

Particularly, in this embodiment, the LEDs 25R, 25G and 25B of each LED set 25 are stacked and the centers Rc, Gc and Bc of their light-emitting surfaces are configured to align on a vertical line. Because the LEDs 25R, 25G and 25B are stacked vertically, they appear to be a plurality of LEDs stacked along a vertical line as seen from a sideward direction relative to the light mixing member 21, but they appear to be a single LED as seen from above or below the light mixing member 21.

Regarding the directivity characteristics of the LEDs as seen from a sideward direction relative to the light mixing member 21, although the light-emitting surface centers of the LEDs 25R, 25G and 25B are at different positions on a vertical line, lights are propagated through the light mixing member 21 while being diffused so as to diverge in the vertical direction by the anisotropic diffusing elements 22. Therefore, it is possible to ignore the fact that the LEDs are disposed at different positions. Regarding the directivity characteristics of the LEDs as seen from above or below the light mixing member 21, the installation positions of the LEDs are superimposed on one another, and the directivity characteristics are also superimposed on one another and thus appear to be the same characteristics. Therefore, the different colors of light from the LEDs 25R, 25G and 25B are propagated through the light mixing member 21 in the state of being superimposed on one another.

Thus, light emitted from the center of the light-emitting surface of each of the LEDs 25R, 25G and 25B, which has a strong emission intensity, can be diffused to mix together, thereby enabling the LEDs 25R, 25G and 25B to be regarded as a single LED. This makes it possible to ignore the fact that the LEDs are mounted at various directional positions, which would otherwise exert an influence on the color mixing action. Accordingly, white light with further reduced color irregularity can be obtained from the exit surface 21b.

Other forms of the light source unit according to the present invention that can provide white light with reduced color irregularity will be explained with reference to FIGS. 7a to 8b. These alternative forms of the light source unit differ from the above in the configuration of the anisotropic diffusing elements 22. FIG. 7a shows an alternative configuration of the anisotropic diffusing elements 22 in which parallel rows of anisotropic diffusing elements are at an angle of inclination to the axis of the light mixing member 21 in the length direction l. FIG. 7b shows another alternative configuration of the anisotropic diffusing elements 22 in which there are two sets of parallel rows of anisotropic diffusing elements that are different from each other in the angle of inclination to the axis of the light mixing member 21 in the length direction l. The two sets of parallel rows of anisotropic diffusing elements intersect each other.

FIGS. 8a and 8b are schematic views showing other alternative configurations of the anisotropic diffusing elements 22 in which the anisotropic diffusing elements are in the form of discontinuous lines. FIG. 8a shows anisotropic diffusing elements comprising discontinuous striped recesses. FIG. 8b shows anisotropic diffusing elements comprising dot-shaped recesses. The anisotropic diffusing elements may have any of various cross-sectional configurations. The anisotropic diffusing elements are not limited to recesses but may be projections.

In FIG. 7a, the anisotropic diffusing elements 22 are a plurality of parallel striped recesses provided at an angle θ of inclination to the length direction l of the light mixing member 21. The anisotropic diffusing elements 22 having an inclination to the length direction l of the light mixing member 21 diffuse light not only in the thickness direction t of the light mixing member 21 but also in the length direction l thereof. When the angle θ is small, the greater part of light is diffused in the thickness direction t of the light mixing member 21. As the angle θ increases, the amount of light diffused in the length direction l of the light mixing member 21 increases. If the LED sets 25 are arranged as shown in FIG. 1, mixing of colors of light emitted from the mutually adjacent LED sets 25 is promoted, so that it is possible to obtain white light with reduced color irregularity. It should be noted that the purpose of the present invention is to mix different colors of light from the LEDs 25R, 25G and 25B having different emission spectrum peak wavelengths; therefore, the angle θ is preferably larger than 0° and not larger than 45°.

As shown in FIG. 7b, the anisotropic diffusing elements 22 may include two anisotropic diffusing elements 22A and 22B each comprising a plurality of parallel elongated recesses provided at an angle of inclination to the length direction l of the light mixing member 21. The anisotropic diffusing elements 22A and 22B are provided to intersect each other. The anisotropic diffusing elements 22A have an inclination angle θ. The anisotropic diffusing elements 22B have an inclination angle δ. The angle θ and the angle δ may be either the same or different. In this case also, it is possible to diffuse light not only in the thickness direction t of the light mixing member 21 but also in the length direction l thereof and hence possible to obtain white light with reduced color irregularity in the same way as the anisotropic diffusing elements 22 shown in FIG. 7a. If the angle θ and the angle δ are set equal to each other, light can be diffused in a well-balanced condition in both the thickness direction t and length direction l of the light mixing member 21.

The anisotropic diffusing elements 22 in the form of discontinuous lines shown in FIGS. 8a and 8b comprise parallel rows of elongated recess patterns. In the anisotropic diffusing elements 22 shown in FIG. 8a, each recess pattern comprises dash-shaped recesses. Although in FIG. 8a non-recessed regions between the dash-shaped recesses in each row are provided regularly, they may be provided irregularly. The anisotropic diffusing elements 22 shown in FIG. 8b comprise dot-shaped recesses provided with a slight gap between each pair of adjacent recesses. The dot-shaped recesses have a semicircular cross-sectional configuration. Thus, the anisotropic diffusing elements 22 can diffuse light in both the thickness direction t and length direction l of the light mixing member 21.

If the anisotropic diffusing elements 22 are provided in the form of discontinuous recess patterns as stated above, each recess pattern comprises recessed regions and non-recessed regions. Therefore, non-diffused rectilinearly propagated light is obtained at the non-recessed regions. Accordingly, the anisotropic diffusing elements 22 can also be utilized to control the degree of color mixing. By controlling the extent of discontinuity of the recess patterns, it is possible to adjust the balance of colors and hence possible to obtain white light with reduced color irregularity. It should be noted that the anisotropic diffusing elements 22 in the form of discontinuous lines are also applicable to the light mixing members 21 shown in FIGS. 7a and 7b.

In this embodiment, a plurality of LEDs 25R, 25G and 25B having different emission spectrum peak wavelengths are arranged such that the centers Rc, Gc and Bc of their light-emitting surfaces are in the same plane 200, as has been stated above. Other alternative arrangements of the LEDs 25R, 25G and 25B will be explained below with reference to FIGS. 9a to 9d. FIG. 9a shows an arrangement in which the R, G and B LEDs 25R, 25G and 25B are disposed in series in a direction perpendicular to the entrance surface 21a of the light mixing member 21. FIG. 9b shows an arrangement in which the R, G and B LEDs 25R, 25G and 25B are disposed in a stair-like fashion in front of the entrance surface 21a of the light mixing member 21. FIG. 9c shows an arrangement in which the R and B LEDs 25R and 25B are disposed slightly away from the entrance surface 21a of the light mixing member 21, while the G LED 25G is disposed in close proximity to the entrance surface 21a. FIG. 9d shows an arrangement in which the R, G and B LEDs 25R, 25G and 25B are positioned in conformity to the configuration of the light mixing member 21. It should be noted that FIGS. 9a to 9d are side views of the light source unit 20 as seen from the side surface 21e.

In the arrangement shown in FIG. 9a, the LEDs 25R, 25G and 25B emit light toward a reflecting member (not shown) provided obliquely at a position directly above the LEDs 25R, 25G and 25B so that reflected light from the reflecting member is incident on the entrance surface 21a of the light mixing member 21. This arrangement is advantageous in that the light mixing member 21 can be reduced in thickness.

In the arrangement shown in FIG. 9b, the distance between each LED and the entrance surface 21a of the color mixing member 21 differs according to the light intensity directivity characteristics of each LED. Therefore, this arrangement can be selected as a scheme to adjust the light intensity directivity characteristics.

The arrangement shown in FIG. 9c also takes into consideration the light intensity directivity characteristics of each LED.

In the arrangement shown in FIG. 9d, the light mixing member 21 has three entrance surfaces 21a, and the LEDs 25R, 25G and 25B are respectively disposed near the three entrance surfaces 21a. Each entrance surface 21a is provided with anisotropic diffusing elements 22. Therefore, color mixing readily occurs near the entrance surfaces 21a.

It should be noted that various LED arrangements are available in addition to those shown in FIGS. 9a to 9d. Regarding an LED arrangement in which LEDs are positioned in conformity to the configuration of the light mixing member 21 as shown in FIG. 9d also, various arrangements in addition to the above are available. Although in the foregoing LED arrangements, each LED set comprises three different kinds of LEDs, i.e. LEDs 25R, 25G and 25B, it should be noted that arrangements similar to the above can be employed also in the case of LED sets each comprising two or more different kinds of LEDs. For example, a green (G) LED may be added to use a total of four LEDs to constitute each LED set. When two different kinds of LEDs are employed, a combination of a whitish LED comprising a blue LED element coated with a fluorescent substance and a red LED is usable to constitute each LED set. It is preferable to properly select one of the foregoing LED arrangements in accordance with the desired specifications.

Although the light mixing member 21 in this embodiment has a substantially rectangular parallelepiped configuration, the configuration of the light mixing member 21 is not necessarily limited to a substantially rectangular parallelepiped, but various other configurations can be adopted. For example, the light mixing member 21 may have a configuration in which mutually opposing side surfaces are substantially semicircular, or a configuration in which the corners of the entrance surface are cut off as shown in FIG. 9d. The light mixing member 21 may also have a pentagonal or triangular configuration. Although the light mixing member 21 in this embodiment, shown in FIG. 1, has a configuration in which the size in the length direction l is larger than the size in the thickness direction t, the configuration of the light mixing member 21 may be such that the size in the length direction l is smaller than the size in the thickness direction t. In this case also, the light mixing member 21 is used with the same specifications as the above.

Although in this embodiment the anisotropic diffusing elements 22 are provided on the entrance surface 21a of the light mixing member 21, they may also be provided on a surface other than the entrance surface 21a, for example, on the exit surface 21b. If the anisotropic diffusing elements 22 are provided on the exit surface 21b, the different colors of exiting light mix together outside the exit surface 21b. Thus, color mixing can be performed even more effectively. It also becomes easier for light to exit the light mixing member 21. The anisotropic diffusing elements 22 may also be provided on the top surface 21c or the bottom surface 21d. In this case, diffusion occurs in the width direction w of the light mixing member 21. The anisotropic diffusing elements 22 may also be provided on the side surface 21e or 21f.

In this embodiment, the anisotropic diffusing elements 22 are provided on the entrance surface 21a of the light mixing member 21. If the anisotropic diffusing elements 22 are provided on an outer peripheral surface of the light mixing member 21, it becomes easier to form the light mixing member 21, advantageously. The anisotropic diffusing element 22 may be provided inside the light mixing member 21. For example, the light mixing member 21 may be provided therein with a plurality of hollow portions where diffusion of light occurs, e.g. circular or semicircular tubular hollow portions.

As has been stated above, it is possible according to this embodiment to provide a light source unit capable of obtaining white light with reduced color irregularity.

The present invention will be explained below in more detail with regard to specific embodiments. In an embodiment shown in FIGS. 10 and 11, a light source unit 50 has an LED set 25 mounted on a mounting substrate 24, a light mixing member 51 that mixes different colors of light emitted from the LED set 25, and reflecting members 57 provided at the outer periphery of the LED set 25 and the light mixing member 51.

The light mixing member 51 is of a substantially rectangular parallelepiped configuration and has anisotropic diffusing elements 52 respectively provided on an entrance surface 51a, an exit surface 51b, a top surface 51c and a bottom surface 51d thereof. The configuration of the anisotropic diffusing elements 52 is similar to that of the anisotropic diffusing elements 22 in the foregoing embodiment.

The reflecting members 57 are provided at two positions, respectively, i.e., at the top surface 51c side and the bottom surface 51d side of the light mixing member 51. Each reflecting member 57 reflects light passing through the top surface 51c or the bottom surface 51d back into the light mixing member 51. It should be noted that the reflecting member 57 may be provided at a side surface of the light mixing member 51 or at the rear of the mounting substrate 24. In this embodiment, a reflecting member having a high reflectivity is used. It is also possible to use a reflecting member having a strong diffusing action in addition to its reflecting action. A sheet- or plate-shaped reflecting member is suitably used as each reflecting member 57. However, the configuration of the reflecting member 57 is not limited thereto but may be set arbitrarily.

The operation of this embodiment will be explained below with reference to FIG. 11. In this embodiment, the same action takes place at the top surface 51c and the bottom surface 51d. Therefore, only the action at the top surface 51c will be explained below. Light rays P1, P2, P3 and P4 represent only a part of light propagating through the light mixing member 51. As shown in FIG. 11, the light rays P1, P2 and P3 are diffused in the width direction w of the light mixing member 51 by the anisotropic diffusing elements 52 formed on the entrance surface 51a. The diffused rays P1, P2 and P3 are incident on the interface 51g of an anisotropic diffusing element 52 provided on the top surface 51c at different angles. The light rays P1, P2 and P3 incident on the interface 51g at angles not smaller than the critical angle are reflected and diffused in the width direction w of the light mixing member 51. At this time, the light rays P1, P2 and P3 are diffused in different directions because they are incident on the interface 51g at different angles.

Meanwhile, the light ray P4 incident on the interface 51g at an angle smaller than the critical angle exits the light mixing member 51 and is reflected by the reflecting member 57 to reenter the light mixing member 51. At this time, all the light except that which is perpendicularly incident on the interface 51g is refracted when exiting the light mixing member 51. When reentering the light mixing member 51, the light is similarly refracted. Because refraction occurs when the light exits or enters the light mixing member 51, the diffusion in the width direction w of the light mixing member 51 is promoted.

The light rays P1, P2, P3 and P4 are propagated toward the exit surface 51b while repeating the above-described diffusion. Among the diffused light rays, those which are incident on the recesses of the exit surface 51b at angles larger than the critical angle are reflected and further diffused by the anisotropic diffusing elements 52. Meanwhile, light rays incident on the recesses of the exit surface 51b at angles smaller than the critical angle are allowed to exit as white light of good color balance and with reduced color irregularity as a result of undergoing sufficient color mixing through diffusion by the light mixing member 51. In addition, because the exit surface 51b is also provided with the anisotropic diffusing elements 52, the amount of light emitted from the light source unit 50 increases. Thus, the light utilization efficiency can be increased.

FIG. 12 is a fragmentary sectional view of an essential part of a light source unit 60 according to another embodiment of the present invention. The LED light source in this embodiment uses LEDs having the same specifications as those of the LEDs in the foregoing embodiments. Therefore, the LEDs in this embodiment are denoted by the same reference numerals as used in the foregoing embodiments, and redundant explanation is omitted. In this embodiment, the LEDs of an LED set 25 are arranged as shown in FIG. 9a. Anisotropic diffusing elements 62 are formed only on the following three surfaces of a light mixing member 61: an entrance surface 61a, a top surface 61c, and a bottom surface 61d. Further, a reflecting member 67-3 is provided.

A mounting substrate 24 on which the LEDs 25R, 25G and 25B of the LED set 25 are mounted is disposed in substantially the same plane as the bottom surface 61d of the light mixing member 61 and the LED set 25 is configured to emit light upward. The reflecting member 67-3 extends curvedly from an end of a reflecting member 67-1 that is closer to the LED set 25 to an end of a reflecting member 67-2 that is closer to the entrance surface 61a so as to cover the LED set 25 and the entrance surface 61a with an air layer interposed therebetween. The configuration of the anisotropic diffusing elements 62 is similar to that of those in the foregoing embodiments.

The operation of the light source unit 60 will be explained below. Diffusion effected by the anisotropic diffusing elements 62 is similar to that explained above. Therefore, redundant explanation is omitted. As shown by the arrows in the figure, many of light rays emitted from the LED set 25 are incident on the entrance surface 61a of the light mixing member 61 after being reflected by the reflecting member 67-3. Because the reflecting member 67-3 has a curved surface, light rays reflected by the reflecting member 67-3 travel in various directions. Thus, diffusion of light occurs. The rest of light rays from the LED set 25 are directly incident on the entrance surface 61a. Because either of the light rays from the LED set 25 are incident on the entrance surface 61a at angles thereto as compared, for example, to the embodiment shown in FIG. 10, the light rays are diffused in the light mixing member 61. Accordingly, white light with further reduced color irregularity can be obtained from an exit surface 61b of the optical color mixing member 61.

In addition, the light source unit 60 enables the light mixing member 61 to be reduced in thickness because the LEDs 25R, 25G and 25B of the LED set 25 are arranged in substantially the same plane as the bottom surface 61d of the light mixing member 61. Further, the thickness of the light source unit 60 itself can be reduced to the same level as a common lightguide plate using a white LED light source. It is also possible to use large-sized LEDs which emits a large amount of light.

It should be noted that the reflecting members 67-1, 67-2 and 67-3, which are provided as separate members in this embodiment, may be integrally formed as a single member.

Next, another embodiment of the present invention in which reflecting members are provided will be explained with reference to FIG. 13.

The light source unit 70 according to this embodiment differs from the above-described light source units 20, 50 and 60 in the use of an LED set 75 comprising a whitish LED (75By) and a red (R) LED (75R) mounted on a mounting substrate 74.

The light source unit 70 includes an LED set 75, a light mixing member 71 that diffuses light from the LED set 75 to emit white light with reduced color irregularity, and reflecting members 77 that reflect light exiting through surfaces of the light mixing member 71 other than an exit surface 71b back into the light mixing member 71. The light mixing member 71 has anisotropic diffusing elements 72 provided only on the following three surfaces thereof: an entrance surface 71a, a top surface 71c, and a bottom surface 71d.

The whitish LED 75By of the LED set 75 is formed by packaging a blue light-emitting diode element coated with a transparent resin having a yellow (YAG: yttrium aluminum garnet) fluorescent substance dispersed therein. In the whitish LED 75By, the fluorescent particles are excited to emit yellow light by a part of blue light emitted from the blue light-emitting diode, and whitish light is obtained from the packaged LED light source. The red (R) LED 75R is similar to the red (R) LED 25R, which emits red light, as has been explained in the foregoing embodiments.

In this case, whitish light from the whitish LED 75By is mixed with red light from the LED 75R to obtain light including an emission wavelength in the red region. Because a red light component is added to whitish light emitted from the LED light source, the color reproduction range of color images displayed on a liquid crystal display panel can be expanded, as compared to the conventional light source comprising only a whitish LED. In addition, the thickness of the light mixing member 71 can be reduced because only two different kinds of LEDs are needed. It is also possible to reduce the number of man-hours needed to assemble the light source unit 70. It should be noted that reflection by the reflecting members 77 and the color mixing action to obtain white light with reduced color irregularity are the same as in the foregoing embodiments.

In the foregoing description of the embodiments, only the main constituent components of the light source unit have been explained. The main constituent components may be housed in a casing or the like to form an easy-to-handle light source unit. The housed light source unit facilitates transportation and assembling into a backlight unit.

Next, a display apparatus 90 having a backlight unit with a light source unit according to the present invention will be explained with reference to FIGS. 14 and 15.

The display apparatus 90 has, as shown in FIG. 14, a backlight unit 80 at the back of a liquid crystal display panel 86. As the liquid crystal display panel 86, a transmissive liquid crystal display panel is used. The liquid crystal display panel 86 in this embodiment is an active-matrix liquid crystal display panel using TFTs (thin film transistors) to form pixels. The TFT pixels are provided with color filters of red (R), green (G) and blue (B). Thus, a color image is displayed on the liquid crystal display panel 86 with illuminating light from the backlight unit 80.

The backlight unit 80 comprises a lightguide plate 81, a reflecting member 83 provided underneath the lightguide plate 81, a stack of a diffusing sheet 84 and two prism sheets 85-1 and 85-2 provided directly above the lightguide plate 81, and a light source unit 50 disposed near a side surface of the lightguide plate 81. The light source unit 50 is the same as the light source unit 50 shown in FIG. 10. Therefore, the constituent components of the light source unit 50 are denoted by the same reference numerals as used in FIG. 10. The following is an explanation of the constituent components of the backlight unit 80.

As the reflecting member 83, for example, a sheet-shaped reflecting member having a high reflectivity is used. The reflecting member 83 can reflect light passing through a bottom surface 81d of the lightguide plate 81 back into the lightguide plate 81. The reflecting member 83 has the function of increasing the light utilization efficiency and also has the function of diffusing light in the lightguide plate 81 because light reflected by the reflecting member 83 is refracted when reentering the lightguide plate 81. It should be noted that a reflecting member having a diffusing action is also usable as the reflecting member 83.

The diffusing sheet 84 can diffuse light exiting the lightguide plate 81 over a wide range to make uniform the color tone and intensity of the exiting light. Examples of suitably usable diffusing sheets are resin sheet having a diffusing layer containing resin particles or the like, and a resin sheet having a finely rugged surface.

The two prism sheets 85-1 and 85-2 each have a multiplicity of prisms of triangular cross-section arranged in series such that the ridges of the prisms form parallel rows. The prism sheets 85-1 and 85-2 are disposed so that their respective prism ridges perpendicularly intersect each other in plan view. The prism sheets 85-1 and 85-2 arranged in this way increase the amount of light emitted in the vertical direction, thereby enabling the liquid crystal display panel 86 to be illuminated brightly.

The lightguide plate 81 is, as shown in FIG. 15, an edge-light type lightguide plate in a flat plate shape of quadrilateral cross-section. The lightguide plate 81 has an entrance surface 81a through which light emitted from the light source unit 50 enters the lightguide plate 81, an exit surface 81c through which light exits the lightguide plate 81, and a bottom surface 81d facing opposite the exit surface 81c. The bottom surface 81d is formed with prisms or other reflecting elements (not shown) to reflect light entering through the entrance surface 81a toward the exit surface 81c and also to guide the light toward the inner side of the lightguide plate 81. The lightguide plate 81 is formed by injection molding process or the like using a transparent resin, e.g. an acrylic resin, or a polycarbonate resin.

The entrance surface 81a of the lightguide plate 81 is provided with the second anisotropic diffusing elements 82 that diffuse light in the length direction (K) of the lightguide plate 81. Here, let us explain the directions of the arrows shown in FIG. 15. The double-pointed arrows X shown by the alternate long and short dash line indicate the light propagation direction, i.e. the axis of a direction in which light entering through the entrance surface 81a propagates toward the surface facing opposite the entrance surface 81a. A direction that is parallel to the exit surface 81c and perpendicular to the light propagation direction (X) is defined as the length direction (K) of the lightguide plate 81 and indicated by the double-pointed arrows and alternate long and two short dashes line. Further, a direction that is perpendicular to both the length direction (K) and light propagation direction (X) of the lightguide plate 81 is defined as the thickness direction T of the lightguide plate 81 and indicated by the double-pointed arrows.

The second anisotropic diffusing elements 82 comprise a plurality of recesses of semicircular cross-section formed to extend in the thickness direction t of the lightguide plate 81. Thus, light incident on the recesses can be diffused in the length direction (K) of the lightguide plate 81.

A plurality of LED sets 25 of the light source unit 50 provided near the entrance surface 81a of the lightguide plate 81 are spaced from each other in the length direction (K) of the lightguide plate 81. The LED sets 25 are disposed near the entrance surface of the light mixing member 51 at such an interval that light from mutually adjacent LED sets 25 mix together. In this embodiment, two LED sets 25 are provided.

The following is an explanation of the operation of the display apparatus 90.

White light with reduced color irregularity obtained as a result of undergoing color mixing by the light source unit 50 exits through the exit surface 51b of the light mixing member 51 and enters the lightguide plate 81 through the entrance surface 81a. The light is further subjected to color mixing by refraction when exiting the light mixing member 51 and refraction when entering the lightguide plate 81. Consequently, white light with further reduced color irregularity can be obtained from the exit surface 81c of the lightguide plate 81. Particularly, diffusion in the length direction (K) of the lightguide plate 81 is promoted by the second anisotropic diffusing elements 82 on the entrance surface 81a of the lightguide plate 81. Accordingly, further color mixing occurs in the lightguide plate 81, and white light with further reduced color irregularity is obtained.

Further, reflected light from the reflecting elements provided on the bottom surface 81d of the lightguide plate 81 and reflected light from the reflecting member 83 mix with the light propagating through the lightguide plate 81. Thus, the diffusion is promoted, and the amount of light satisfying the exit conditions for light to exit through the exit surface 81c increases. Hence, the amount of light exiting through the exit surface 81c also increases. Accordingly, a uniform amount of light exits from a region of the exit surface 81c near the entrance surface 81a of the lightguide plate 81 in the same way as from the other region of the exit surface 81c. Thus, white light with reduced color irregularity is emitted from the lightguide plate 81.

In the related conventional art, color irregularity occurs owing to the fact that, near the entrance surface of the lightguide plate, color mixing is not sufficiently performed and the amount of exiting light is small. In the above-described backlight unit 80, such problems are solved, and color irregularity is reduced. It should be noted that because the exit surface of the light mixing member 51 is also provided with anisotropic diffusing elements 52, light mixing is also performed at the exit surface. Thus, the improvement of the luminance uniformity of the backlight unit 80 and color mixing are further promoted.

Further, the white light exiting through the exit surface 81c of the lightguide plate 81 is further diffused by the diffusing sheet 84 and passed through the prism sheets 85-1 and 85-2 to increase the amount of light traveling in the vertical direction. Thus, it is possible to illuminate the liquid crystal display panel 86 with bright white light. Accordingly, substantially no color irregularity is visible in a color image obtained from the display apparatus 90. In addition, because R, G and B LEDs are used, the color reproduction range can be expanded, and it becomes possible to display dark red and dark green, which have heretofore been difficult to produce with conventional image display systems.

Conventional backlight units require their lightguide plate, diffusing sheet and prism sheets to be made larger in size than the image display area of a display panel in order to eliminate color irregularity occurring at the peripheral portion of the exit surface of the lightguide plate. In contract, the backlight unit having the above-described structure can eliminate color irregularity without requiring its lightguide plate, diffusing sheet and prism sheets to be so large as in the conventional backlight units. Accordingly, the material cost can be reduced advantageously.

Although the light source unit 50 in this embodiment uses LED sets 25 comprising three different kinds of LEDs, i.e. R, G and B LEDs, it is also possible to use the light source unit 70 comprising two different kinds of LEDs, i.e. a whitish LED and a red light-emitting LED, as in the embodiment shown in FIG. 13. A light source unit comprising two different kinds of LEDs enables the thickness thereof to be slightly reduced. In addition, the lightguide plate can also be reduced in thickness. Therefore, the backlight unit itself can be reduced in thickness. It is also possible to use the light source unit 60 comprising three different kinds of LEDs arranged planarly as in the embodiment shown in FIG. 12. In this case also, the thickness of the light source unit can be reduced. In addition, the lightguide plate can be reduced in thickness, and the backlight unit can be reduced in thickness. In the case of a backlight unit using a light source unit comprising three different kinds of LEDs arranged planarly, it is possible to use large-sized LEDs and hence possible to provide illumination of high luminance.

The light source unit is replaceable. For example, in the backlight unit using a white LED light source that has been explained above in connection with the related conventional art, a light source unit having LED sets 25 of R, G and B LEDs arranged planarly can be used in place of the white LED light source. The replaceable light source unit makes it possible to obtain a backlight unit capable of improving the display image quality simply by replacing the LED light source with the light source unit without changing the lightguide plate and the reflecting and diffusing sheets provided at the lower and upper sides of the lightguide plate in the conventional backlight unit. If the light source is unitized, it is easy to assemble the backlight unit and hence possible to reduce the number of man-hours needed in the assembling process.

Although in this display apparatus the light mixing member of the light source unit and the lightguide plate are disposed with an air layer interposed therebetween, the light mixing member and the lightguide plate may be disposed in close contact with each other.

If the light mixing member and the lightguide plate are disposed in close contact with each other, a photocurable resin or other transparent resin is used between the lightguide plate and the light mixing member. Generally, the lightguide plate is formed by using a transparent resin, e.g. an acrylic or polycarbonate resin, and the light mixing member is also formed by using a similar resin material. These transparent resins lack in flexibility. Therefore, it is difficult to stick the two members fast to each other simply by pressing them against each other. For this reason, the lightguide plate and the light mixing member are brought close to each other with a transparent resin having fluidity sealed therebetween, and the resin is set in this state with no air layer present between the two members, thereby sticking them fast to each other.

In the backlight unit wherein the light mixing member and the lightguide plate are placed in close contact with each other, light emitted from the light source unit enters the lightguide plate through a short distance without passing through an air layer. Therefore, the loss of light is reduced, and it is possible to take an increased amount of light through the entrance surface of the lightguide plate. Consequently, the light utilization efficiency of the backlight unit improves, and it is possible to realize a brighter backlight unit.

Regarding materials used to form the lightguide plate and the light mixing member, the material of the light mixing member has a smaller refractive index than that of the material of the lightguide plate. For example, the lightguide plate is formed by using a polycarbonate resin having a refractive index of 1.58, and the light mixing member is formed by using an acrylic resin having a refractive index of 1.49. In this case, light emitted from the LED light source passes through an air layer having a refractive index of 1 and enters the light mixing member having a refractive index of 1.49. At this time, because the light from the light source is propagated from a substance of a low refractive index to a substance of a high refractive index, the light is not influenced by the critical angle for reflection at the interface between the two substances. The same is the case with the propagation of light from the light mixing member having a refractive index of 1.49 to the lightguide plate having a refractive index of 1.58. That is, the light is not influenced by the critical angle for reflection during the propagation from the light mixing member to the lightguide plate.

A transparent resin used between the lightguide plate and the light mixing member should have a refractive index intermediate between those of the lightguide plate and the light mixing member, i.e. a refractive index of about 1.54. Light from the LED light source is propagated through the light mixing member, the transparent resin and the lightguide plate in the order mentioned. That is, the light is propagated from a substance of a low refractive index to a substance of a high refractive index. Therefore, the light is not influenced by the critical angle for reflection at each interface. Accordingly, light traveling in all directions toward the entrance surface of the lightguide plate is allowed to exit the light source unit. Thus, the amount of light entering the lightguide plate through the entrance surface increases, and a brighter backlight unit can be realized. In this case also, white light with reduced color irregularity is obtained by the light source unit. Therefore, white light with reduced color irregularity is emitted from the lightguide plate.

It should be noted that a transparent resin used between the lightguide plate and the light mixing member may be an adhesive capable of mechanical fixing or may be a paste-shaped adhesive having no adhesiveness. It is also possible to form the light mixing member by a transparent resin used between the lightguide plate and the light mixing member. In this case, a transparent resin having a refractive index smaller than that of the lightguide plate is used. Light emitted from the LED light source propagates through the air layer, the light mixing member and the lightguide plate in the order mentioned, i.e. from a substance of a low refractive index to a substance of a high refractive index. Therefore, the light is not influenced by the critical angle for reflection at each interface.

An appropriate one of the positional arrangements of the backlight unit and the light source unit may be selected according to the necessity degree of color mixing. Differences between the positional arrangements of the backlight unit and the light source unit will be explained below.

In a case where the backlight unit and the light source unit are disposed with an air layer interposed therebetween, light traveling in a limited range of directions exits through the exit surface of the light source unit owing to the critical angle. Light does not exit through the exit surface is reflected inside the light mixing member, changed in angle by the anisotropic diffusing elements and reflected by the reflecting member of the light source unit until the angle of incidence of the light on the exit surface has become an angle at which the light is not influenced by the critical angle. When the incidence angle has reached the above-described angle, the light exits through the exit surface of the light source unit. As a result, color mixing is satisfactorily performed in the light mixing member before the light exits the light source unit. Therefore, it becomes possible to ignore the fact that the LEDs are mounted at different positions. In addition, the light source unit is ideal because it emits light in a specific divergence angle range. Thus, light exiting the backlight unit after entering the lightguide plate is well color-mixed light.

For example, in a case where the thickness of the lightguide plate and the total thickness of LEDs mounted in the LED thickness direction are close to each other, color mixing cannot be performed at a region of the exit surface of the lightguide plate near the entrance surface thereof owing to the fact that LEDs are mounted at different positions in the thickness direction. Therefore, it is necessary to diffuse light by the light source unit that promotes color mixing and allows the well color-mixed light to enter the lightguide plate. In this case, the light source unit should be disposed in close proximity to the lightguide plate with an air layer provided therebetween, and thus, color mixing can be performed even more effectively in the light source unit.

In a case where the lightguide plate and the light source unit are disposed in close contact with each other, the amount of light taken from the light source unit into the lightguide plate increases, and the light utilization efficiency of the backlight unit increases. However, the restriction on the angle of emergence of light from the light source unit decreases, and hence it becomes easy for light to exit the light source unit. Accordingly, it may become impossible to ignore the fact that the LEDs are mounted at different positions. In other words, the color mixing effect is reduced. In such a case, anisotropic diffusing elements are provided on a plurality of surfaces of the light mixing member, or the anisotropic diffusing elements are adjusted so that light is diffused in a wide range of directions, thereby allowing color mixing to be carried out through a short distance. By so doing, white light with reduced color irregularity can be obtained as exiting light.

For example, when the total thickness of LEDs mounted in the LED thickness direction is small relative to the thickness of the lightguide plate, the difference between the LEDs in the mounting position in the thickness direction of the lightguide plate is relatively small. Therefore, the influence on light of the difference between the light source positions reduces. Consequently, the necessity of diffusing light in the light source unit to effect color mixing reduces. Accordingly, the light source unit should be disposed in close contact with the lightguide plate without an air layer interposed therebetween. This arrangement provides a high light utilization effect.

In the foregoing light source unit, backlight unit and display apparatus according to the present invention, the backlight unit and the display apparatus each have one light source unit on one side thereof. In the case of a medium- or large-sized backlight unit or display apparatus, two light source units of the present invention may be respectively provided at both sides thereof. By changing the positional arrangement of a plurality of LEDs, it becomes possible to use a thin lightguide plate. That is, a lightguide plate of a conventional backlight unit using white LEDs can be used as it is. The light source unit and backlight unit of the present invention can also be used as the light source unit and backlight unit of a projector having an image projection function.

It is possible according to the foregoing embodiments to provide a light source unit capable of obtaining white light with reduced color irregularity and a backlight unit and a display apparatus that have the light source unit.

The invention claimed is:

1. A light source unit comprising:
a plurality of light-emitting diodes having different emission spectrum peak wavelengths, respectively; and
a light mixing member having an entrance surface through which lights from the light-emitting diodes are received, an exit surface disposed opposite the entrance surface to allow the lights received through the entrance surface to exit through the exit surface; and
anisotropic diffusing elements comprising a plurality of substantially parallel elongated projections and recesses that are provided on the entrance surface of the light mixing member, the plurality of substantially parallel elongated projections and recesses extending in a length direction of the light mixing member;
the plurality of light-emitting diodes that have different emission spectrum peak wavelengths respectively, being arranged in a direction perpendicular to the length direction of the light mixing member to face the plurality of substantially parallel elongated projections and recesses that diffuse the lights traveling through the entrance surface toward the exit surface and to promote mixing of the lights.

2. The light source unit of claim 1, wherein the light mixing member has a pair of mutually opposing side surfaces extending between the entrance surface and the exit surface, the side surfaces having a height and a width;
a distance between the side surfaces being defined as the length of the light mixing member;
the height of the side surfaces being defined as a thickness of the light mixing member;
the width of the side surfaces being defined as a width of the light mixing member;
wherein the anisotropic diffusing elements diffuse the lights from the light-emitting diodes, which enter through the entrance surface and travel through the light mixing member, in a plane containing an axis extending in a direction of the thickness of the light mixing member and an axis extending in a direction of the width of the light mixing member.

3. The light source unit of claim 2, wherein centers of light-emitting surfaces of the light emitting diodes are configured to be in a common plane, the common plane being substantially perpendicular to the exit surface and substantially parallel to the direction of the thickness of the light mixing member.

4. The light source unit of claim 1, wherein the anisotropic diffusing elements are in form of discontinuous lines.

5. The light source unit of claim 1, wherein the projections or recesses of the anisotropic diffusing elements have a substantially semicircular or triangular cross-section.

6. The light source unit of claim 1, wherein the light mixing member is a substantially rectangular parallelepiped.

7. The light source unit of claim 1, wherein the light mixing member has reflecting members on outer peripheral surfaces thereof except at least the exit surface.

8. The light source unit of claim 1, wherein the light-emitting diodes have emission spectrum peak wavelengths in red, green and blue regions, respectively.

9. The light source unit of claim 1, wherein the light-emitting diodes include a whitish light-emitting diode comprising a blue light-emitting diode element coated with a fluorescent substance.

10. A backlight unit comprising:
an edge-light type lightguide plate; and
the light source unit of claim 1 positioned adjacent to an entrance surface of the lightguide plate.

11. The backlight unit of claim 10, wherein the exit surface of the light source unit and the entrance surface of the lightguide plate are in close contact with each other.

12. The backlight unit of claim 11, wherein the light mixing member of the light source unit is formed from a material having a refractive index smaller than that of a material used to form the lightguide plate.

13. A display apparatus comprising:
a liquid crystal display panel; and the backlight unit of claim 10 positioned at a backside of the liquid crystal display panel.

14. A light source unit comprising:
a plurality of light-emitting diodes having different emission spectrum peak wavelengths, respectively;
a light mixing member having an entrance surface through which lights from the light-emitting diodes are received, an exit surface disposed opposite the entrance surface to allow the lights received through the entrance surface to exit through the exit surface, and
anisotropic diffusing elements comprising a plurality of substantially parallel elongated projections and recesses, the elongated projections and recesses being provided at an angle of inclination to an axis extending in a length direction of the light mixing member, wherein the anisotropic diffusing elements comprise:
first anisotropic diffusing elements comprising a plurality of mutually parallel elongated projections and recesses provided at a first angle to an axis extending in the length direction of the light mixing member; and
second anisotropic diffusing elements comprising a plurality of mutually parallel elongated projections and recesses provided at a second angle to the axis extending in the length direction of the light mixing member, wherein the second anisotropic diffusing elements intersecting the first anisotropic diffusing elements.

* * * * *